Sherman & Fenwick.
Churn.

Nº 29,446. Patented Jul. 31, 1860.

Witnesses:

Inventors:
Daniel Sherman
Robt. W. Fenwick
by Munn & Co.
Attorneys

UNITED STATES PATENT OFFICE.

DAVID SHERMAN, OF UNIONTOWN, MARYLAND, AND ROBERT W. FENWICK, OF WASHINGTON, DISTRICT OF COLUMBIA, ASSIGNORS TO D. SHERMAN AND BERNARD MILLS, OF UNIONTOWN, MARYLAND.

CHURN.

Specification of Letters Patent No. 29,445, dated July 31, 1860.

*To all whom it may concern:*

Be it known that we, DAVID SHERMAN and ROBERT W. FENWICK, the former of Uniontown, in the county of Carroll and State of Maryland, and the latter of Washington, in the District of Columbia, have invented a new and useful Improvement in Churns; and we do hereby declare that the following is a full, clear, and exact description of the same, reference being had to the accompanying drawings, forming a part of this specification, in which—

Figure 1:
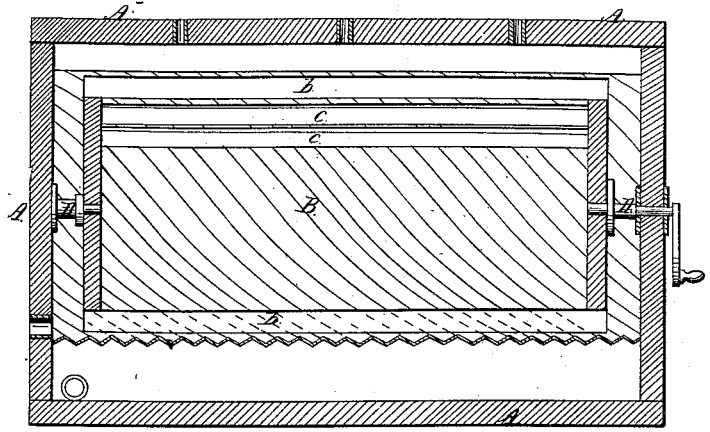
Figure 2:
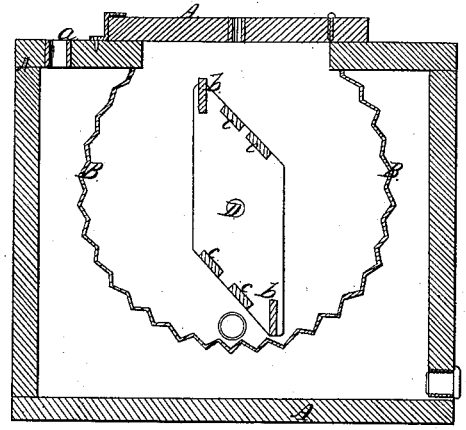
Figure 3:
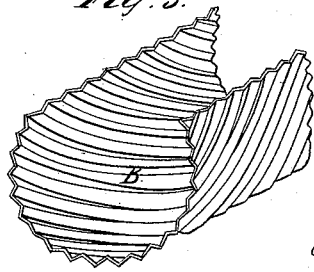

Figure 1, is a vertical longitudinal section of our improved churn, and Fig. 2, a vertical transverse section of the same. Fig. 3, is a perspective view of the curved diagonally corrugated plate.

Similar letters of reference in each of the several figures indicate corresponding parts.

To enable others, skilled in the art, to make and use our invention, we will proceed to describe its construction and operation.

A, represents an outer wooden case made water tight.

B, is a metal plate bent into nearly a cylindrical form and corrugated diagonally or spirally over its whole surface. This plate is fitted by its ends within the case A, and when thus fitted, a space exists between its exterior surface and the interior surface of the case A, as represented in Fig. 2, said space answering for containing warm or cold water when it is necessary to bring the milk or cream to the proper churning temperature. The water is introduced through a tube or hole $a$, in the top of the case A.

The dasher is formed of a shaft D, two transverse bars $b$, $b$, and a series of strips $c$, $c$, as represented. The strips are set one below another on the two beveled ends of the bars so that they stand on opposite sides of the shaft and all strike the cream in their revolution, and cause it to fly off centrifugally in opposite directions, and thus come in contact with the corrugated friction surface.

The main advantage of our churn over others which have preceded it is this. The nearly cylindrical and diagonally or spirally corrugated churning chamber subjects the cream to an immense amount of friction and insures a separation and breaking up of the same. It also, by its peculiar construction, allows the cream to run back toward the center of the churn after one set of the blades of the dasher rise above the surface of the cream and thus a thorough and effective agitation can be continuously carried on and butter be produced in a short period.

It is a very essential thing to force the cream against a surface which will break the direction of the current and at the same time allow the cream to flow back to the point from which is was moved, for by breaking the current, the churning is facilitated. Our diagonally or spirally corrugated churning chamber does this perfectly, and in this respect it differs from other churns which operate on the same principle.

What we claim as our invention, and desire to secure by Letters Patent, is—

Corrugating the surface of the near cylindrical churning chamber diagonally or spirally, in the peculiar manner herein described, in combination with the blades $c$, $c$, (of the dasher) which are set so as to stand across the diagonal or spiral corrugations; substantially as and for the purposes set forth.

DAVID SHERMAN.
ROBT. W. FENWICK.

Witnesses to the signature of David Sherman:
EDMONS SHAPLEY,
CHAS. S. DEVILBISS.

Witnesses to the signature of Robt. W. Fenwick:
GOODWIN Y. AT LEE,
G. F. G. DIETERICH.